United States Patent
Wang

(10) Patent No.: US 9,262,631 B2
(45) Date of Patent: Feb. 16, 2016

(54) EMBEDDED DEVICE AND CONTROL METHOD THEREOF

(71) Applicant: Ko-Fang Wang, Hsinchu County (TW)

(72) Inventor: Ko-Fang Wang, Hsinchu County (TW)

(73) Assignee: MSTAR SEMICONDUCTOR, INC., Hsinchu County (TW)

( * ) Notice: Subject to any disclaimer, the term of this patent is extended or adjusted under 35 U.S.C. 154(b) by 292 days.

(21) Appl. No.: 13/677,479

(22) Filed: Nov. 15, 2012

(65) Prior Publication Data

US 2013/0124845 A1    May 16, 2013

Related U.S. Application Data

(60) Provisional application No. 61/559,780, filed on Nov. 15, 2011.

(30) Foreign Application Priority Data

Jun. 15, 2012 (TW) .............................. 101121603 A

(51) Int. Cl.
  *G06F 9/00* (2006.01)
  *G06F 21/55* (2013.01)
  *G06F 9/44* (2006.01)
  *H04L 9/32* (2006.01)

(52) U.S. Cl.
  CPC ............ *G06F 21/554* (2013.01); *G06F 9/4401* (2013.01); *H04L 9/3247* (2013.01)

(58) Field of Classification Search
  CPC .......................... G06F 1/4401; H04L 63/0428
  USPC ........................................... 713/1.2, 150, 168
  See application file for complete search history.

(56) References Cited

U.S. PATENT DOCUMENTS

| | | | |
|---|---|---|---|
| 8,782,434 B1 * | 7/2014 | Ghose | 713/190 |
| 2002/0002706 A1 * | 1/2002 | Sprunk | 725/29 |
| 2004/0068654 A1 * | 4/2004 | Cockerille et al. | 713/168 |
| 2005/0071633 A1 * | 3/2005 | Rothstein | 713/167 |
| 2006/0020810 A1 * | 1/2006 | Waltermann et al. | 713/179 |
| 2006/0020821 A1 * | 1/2006 | Waltermann et al. | 713/189 |
| 2006/0236122 A1 * | 10/2006 | Field et al. | 713/187 |
| 2009/0193211 A1 * | 7/2009 | Hu et al. | 711/163 |
| 2010/0070775 A1 * | 3/2010 | Dik et al. | 713/187 |
| 2010/0162352 A1 * | 6/2010 | Haga et al. | 726/2 |

FOREIGN PATENT DOCUMENTS

CN    1659494 B    8/2005

* cited by examiner

*Primary Examiner* — Jaweed A Abbaszadeh
*Assistant Examiner* — Phil Nguyen
(74) *Attorney, Agent, or Firm* — WPAT, PC; Justin King

(57) ABSTRACT

An embedded device including a random access memory (RAM) and a processor is provided. The processor includes a processor core and an authentication module. The RAM stores data-to-be-authenticated. The data includes a program code to be executed by the processor core. The authentication module periodically accesses and authenticates the data-to-be-authenticated in the RAM. When the authentication module deems that the program code in the RAM loses its integrity, the authentication module interrupts the processor from further executing the program code.

14 Claims, 4 Drawing Sheets

EMBEDDED DEVICE AND CONTROL METHOD THEREOF

This application claims the benefit of U.S. provisional application Ser. No. 61/559,780, filed Nov. 15, 2011 and the benefit of Taiwan application Serial No. 101121603, filed Jun. 15, 2012, the subject matter of which are incorporated herein by reference.

BACKGROUND OF THE INVENTION

1. Field of the Invention

The invention relates to an embedded device and information security control method thereof.

2. Description of the Related Art

An embedded system can be applied in diversified fields, including smart phones, smart televisions, and set-up boxes. A device associated with an embedded system is commonly referred to as an embedded device. As the applications expand, an embedded system also begins to handle a vast amount of critical information, such as personal information, card numbers, account information, and files. With respect to an open system or a semi-open system, preventing the critical information from illegal or unintended acquisition is a top-priority information security protection task of an embedded device.

In the information security industry, a protection method is available for known lurking programs. A lurking program is malicious software (malware for short), which is implanted and lurks in a victim computer system and may be actively manipulated by a hacker to cause the computer to perform illegal and/or unauthorized activities. The above protection method uses a program characteristic code of the lurking program as basis for identifying the lurking program. Thus, before the lurking program is executed or stored to a file system, the protection method intercepts the lurking program to prevent a lurking program event, potentially using one or more characteristic codes associated with a known programmatic or bundled threat. Although offering an advantage of having high detection accuracy, this type of protection method suffers from a shortcoming of being only effective to unpacked and/or known lurking programs.

In another protection method, unauthorized activities are intercepted by monitoring a system for abnormal behaviors or behavioral characteristics. When a malicious activity takes place, such a method detects and intercepts the malicious activity. Such a protection method is unbounded by insufficient program characteristics and may provide satisfactory protection on unknown lurking programs. However, defining so-called abnormal behaviors or behavioral characteristics remains a goal for every information security expert.

SUMMARY OF THE INVENTION

According to an embodiment the present invention, a control method for an embedded system is provided. The control method includes the following steps. A microprocessor executes a program code in a random access memory (RAM). Data-to-be-authenticated in the function program code is authenticated. In the authenticating step, a current digital signature is generated by using the data-to-be-authenticated as an input, and the current digital signature is compared with a predetermined digital signature. When the digital signature does not match the predetermined digital signature, the microprocessor is halted from executing the program code in the RAM.

According to another embodiment of the present invention, an embedded device including a RAM and a processor is provided. The processor includes a processor core and an authentication module. The RAM stores data-to-be-authenticated. The data includes a program code to be executed by the processor core. The authentication module periodically accesses and authenticates the data-to-be-authenticated in the RAM. When the authentication module determines that the program code in the RAM is lacking proper integrity, the authentication module interrupts the processor from executing the program code.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
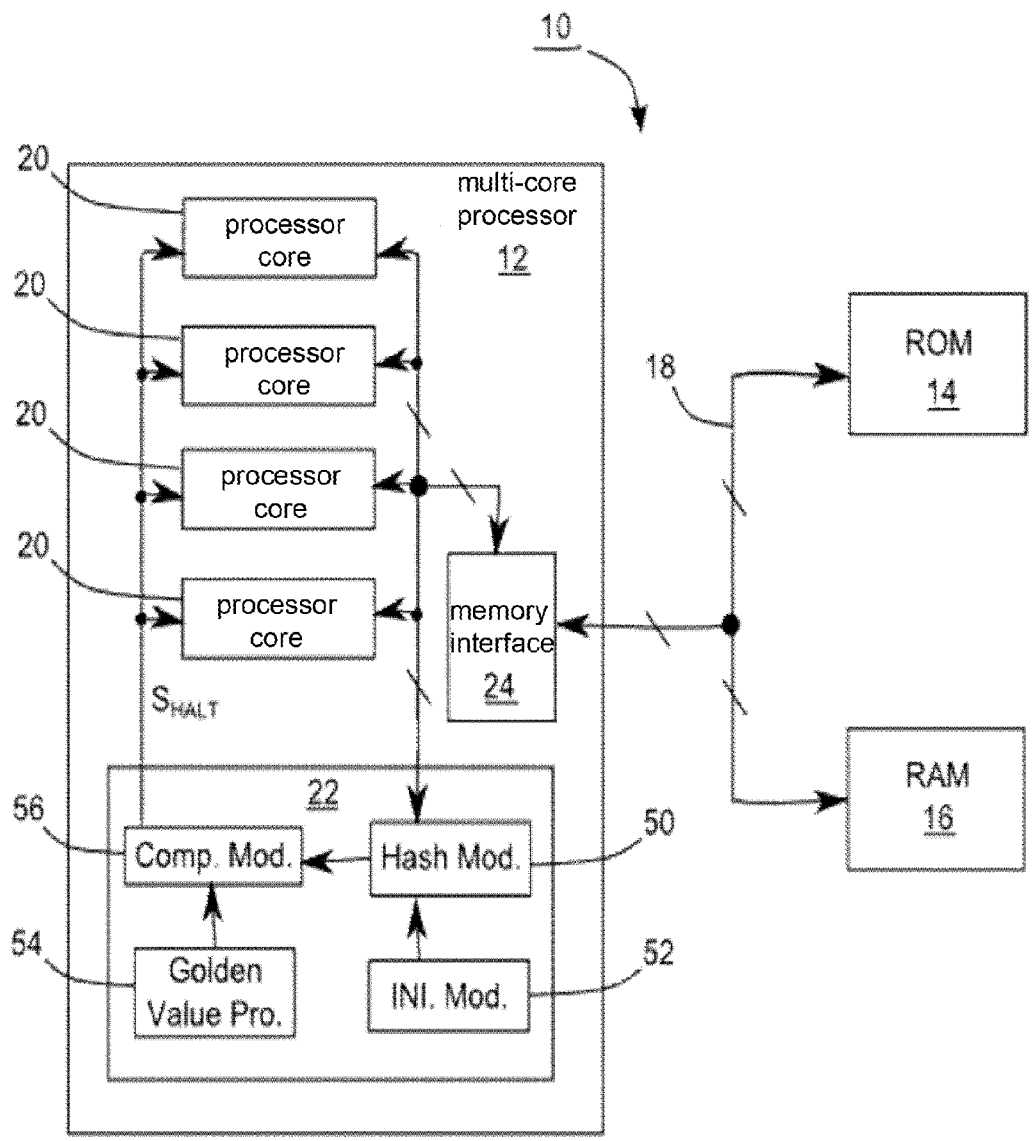
FIG. 1 is an embedded device according to an embodiment of the present invention.

FIG. 1 shows an embedded system 10 according to an embodiment of the present invention. For example, the embedded system 10 can be a smart phone, but the invention is not limited to this particular embodiment and may be implemented on any electronic computing device having comparable computing ability. The embedded system 10 includes a multi-core processor 12, a read-only memory (ROM) 14, and an external random access memory (RAM) 16. The multi-core processor 12, the ROM 14, and the RAM 16 exchange messages through a data bus 18. For example, the multi-core processor 12 is implemented in an integrated circuit.

The ROM 14 may be a flash memory or an electrically-erasable programmable read-only memory (EEPROM) for storing firmware or certain necessary drivers, among other devices. For example, the firmware includes a system kernel and kernel modules to which a common user does not have, or is typically denied, access authorization.

The external RAM 16 is readily writable at all times, typically has a relatively fast data access speed, and often serves as a temporary data storage medium for other programs in operation.

For example, during a boot procedure, the multi-core processor 12 first momentarily duplicates the system kernel and the kernel modules from the ROM 14, having a slower access speed, to the RAM 16, and then accesses and executes the system kernel and the kernel module temporarily stored in the RAM 16. For example, the RAM 16 can be a dynamic random access memory (DRAM).

The multi-core processor 12 includes multiple processor cores 20, an authentication module 22, and a memory interface 24. The processor cores 20 are electrically connected to the authentication module 22 and the memory interface 24.

The multi-core processor 12 may be an integrated circuit. The processor cores 20 and the authentication module 22 access the ROM 14 and the RAM 16 via the memory interface 24. When the processor cores 20 execute the program code temporarily stored in the RAM 16, the authentication module 22 simultaneously authenticates the program code temporarily stored in the RAM 16 in parallel. Details of the authentication process shall be described later. When the authentication fails, the authentication module 22 sends a halt signal $S_{HALT}$ to interrupt the processor cores 20 from executing the temporarily stored program.

It should be noted that, not all program codes temporarily stored in the RAM 16 are authenticated by the authentication module 22. The authentication module 22 only authenticates program codes that are not changed in the RAM 16 when the processor cores 20 are under normal operation.

Figure 2:
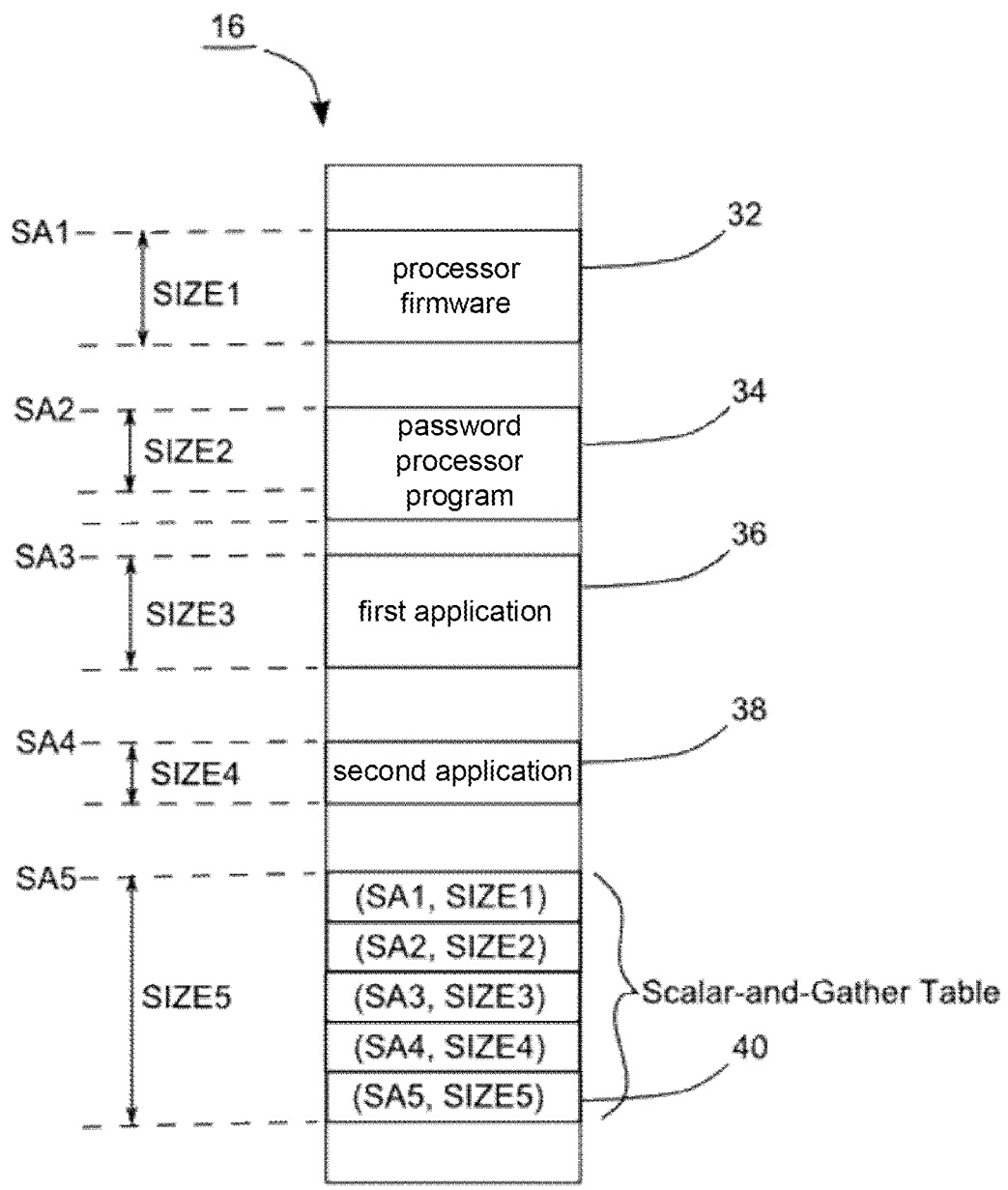
FIG. 2 depicts certain temporarily stored programs and corresponding locations in a RAM.

FIG. 2 shows program codes authenticated by the authentication module 22 according to an embodiment of the present invention. Referring to FIG. 2, some temporarily stored programs and corresponding locations in the RAM 16 are depicted. In the embodiment in FIG. 2, processor firmware is temporarily stored in a block 32. The block 32 has a starting address SA1 and a block size SIZE1. Blocks 34, 36, 38, and 40 temporarily store a password processor program, a first application, a second application, and a scalar-and-gather table, respectively. Starting addresses of the blocks 34, 36, 38, and 40 are respectively SA2, SA3, SA4, SA5, and block sizes of the blocks 34, 36, 38, and 40 are respectively SIZE2, SIZE3, SIZE4, and SIZE5. The scalar-and-gather table records locations of all programs or data-to-be-authenticated in the RAM 16. As shown in FIG. 2, the block 40 stores location information of (SA1, SIZE1) to (SA5, SIZE5).

It should be noted that, FIG. 2 exemplifies certain programs that should not be changed under normal operation of the embedded device rather than limiting the present invention. For example, the RAM 16 may additionally store numbers or text data that are processed by the processor cores 20 and may possibly be updated at any time. The data that may possibly be updated is not authenticated by the authentication module 22. To maintain a clear and simple description, the program codes in the blocks 32, 34, 36, 38, and 40 are all referred to as program codes to be authenticated.

In all embodiments of the present invention, the program code to be authenticated is defined to include at least some program codes to be executed in the RAM 16 when the processor cores 20 are under normal operation. For example, in an alternative embodiment, the program code to be authenticated only includes the processor firmware in the block 32.

Referring to FIGS. 1 and 2, the authentication module 22 includes a hash module 50, an initial value module 52, a golden value module 54, and a comparing module 56.

In an embodiment, the hash module 50 periodically accesses the program code to be authenticated in the RAM 16, and calculates a hash value. In an alternative embodiment, the hash module 50 calculates a hash value each time the processor cores 20 access the program code to be authenticated in the RAM 16.

The hash module 50 may adopt a hash function such as a secure hash algorithm 256 (SHA256) or a hash-based message authentication code (HMAC), and obtains the hash value by calculating the program code to be authenticated according to an initial value provided by the initial value module 52. It should be noted that the present invention is not limited to any specific function or authentication approach.

The golden value module 54 records and provides a golden value representing an expected predetermined hash value under a condition that the program code to be authenticated is not changed. Functionally speaking, the hash function serves as a digital signature of a program code.

Fundamentally, when an inputted program code is changed, the hash value outputted by the hash function also changes. When the golden value and the hash value generated by the hash module 50 match each other, it means that the program code to be authenticated has proper integrity and it is inferred that no unauthorized change event occurs, and so the processor cores 20 continue to access and execute the program in the RAM 16. Once the golden value does not match the hash value generated by the hash module 52, it basically means that program code to be authenticated is changed, i.e., an unauthorized change event occurs. In response, the comparing module 56 sends a halt signal $S_{HALT}$ to interrupt operations of the processor cores 20, so as to prevent the unauthorized activity from further taking place.

The golden value and the initial value can either be determined in each boot procedure of the embedded device 10 or determined in advance. Once determined, the golden value and the initial value cannot be modified. In an embodiment, an initial value may be generated by a random number generator in a boot procedure, and a corresponding golden value is generated according to the initial value.

Figure 3:
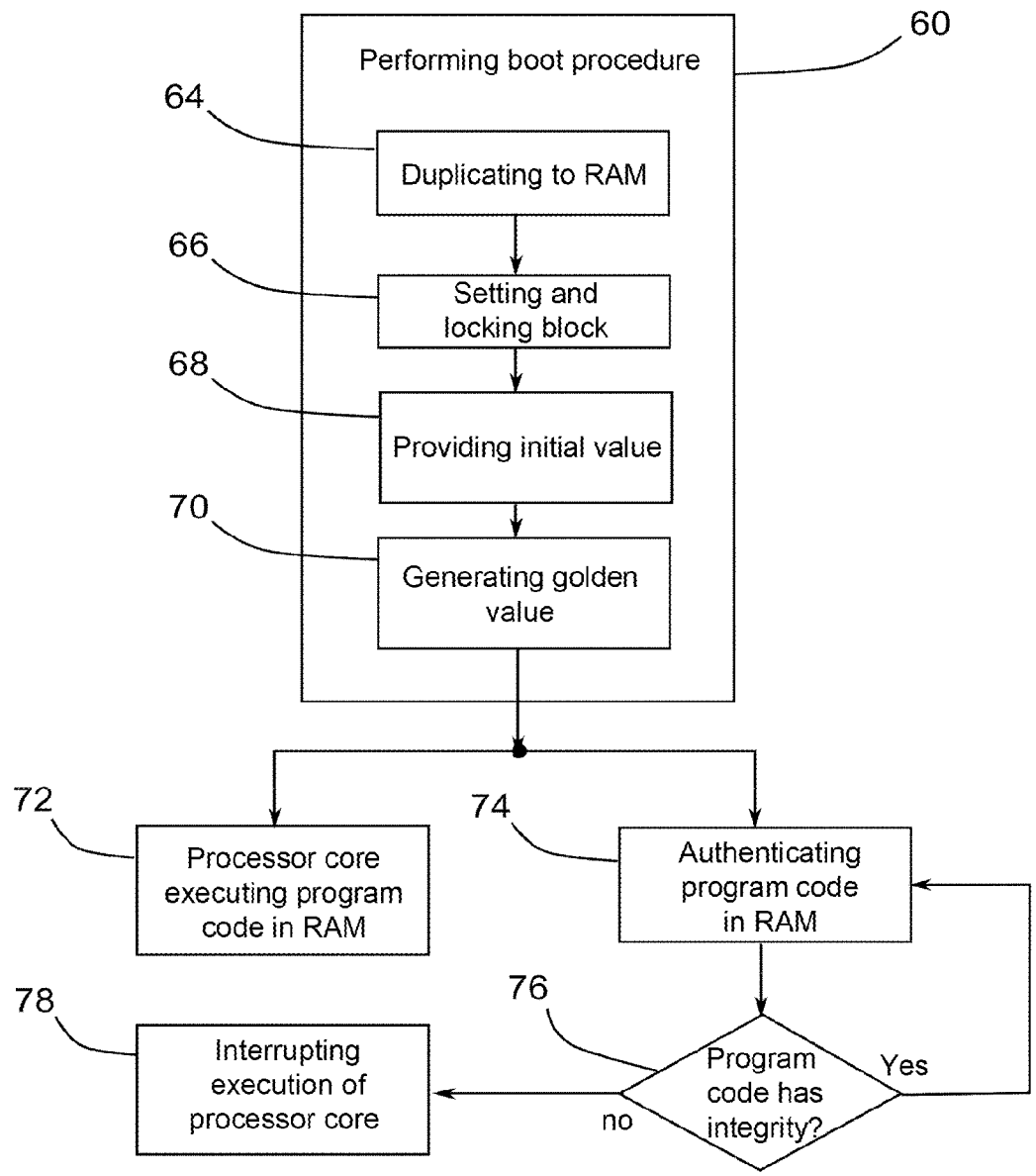
FIG. 3 is a control method for an embedded device according to an embodiment of the present invention.

FIG. 3 shows a control method for an embedded device according to an embodiment of the present invention. The description below is given with reference to the embedded device 10 in FIG. 1 and the RAM 16 in FIG. 2.

A boot procedure 60 is performed when booting the embedded device 10.

The firmware or program is initially stored in a non-volatile memory, e.g., the ROM 14 in the embedded device 10 or an external SD card. Apart from the firmware and program to be executed, the non-volatile memory also stores a scalar-and-gather table. The scalar-and-gather table records locations of all firmware or programs to be authenticated in the RAM 16. In Step 64, according to the scalar-and-gather table, corresponding firmware or program as well as the scalar-and-gather table are duplicated to store in corresponding blocks in the RAM 16.

After Step 64, Step 66 sets the block 40, for storing the scalar-and-gather table, as a fixed block, which does not accept any writing unless a reboot procedure is performed or the entire multi-core processor 12 is reset.

In Step 68, the initial value module 52 provides an initial value. For example, the initial value is generated by a random number generator.

In Step 70, the hash module 50 performs a first calculation. According to the initial value provided by the initial value module 52, the scalar-and-gather table in the block 40, and the programs or data in the corresponding blocks indicated by the scalar-and-gather table as an input, the hash module 50 calculates a hash value through an internal predetermined hash function. The hash value generated from the first calculation is referred to as a golden value. The golden value and the initial value are separately stored or locked, and cannot be modified unless a reboot is performed or an integrated circuit is reset. For example, the golden value is locked in the golden value module 54.

In Step 72, the processor cores 20 start executing to operate according to a command or a program received by the embedded device 10. For example, the processor cores 20 access the program codes in the RAM 16 and sequentially execute the accessed program codes.

While the processor cores 20 execute the program codes, in Step 74, the hash module 50 authenticates the program codes to be authenticated (the programs or data stored in the blocks 32, 34, 36, 38, and 40) according to the locked and stored initial value to generate a hash value. For example, a hash value is calculated by regarding a program code and the initial value as an input according to a hash function.

In Step 76, it is determined whether the hash value matches the golden value. When the hash value matches the golden value, Step 74 is continuously performed to periodically check integrity of the program code to be authenticated. When the hash value does not match the golden value, it means that the program code ought not to be changed is changed and thus loses its integrity, and so Step 78 is performed. In Step 78, normal operations of the processor cores 20 are interrupted.

The so-called integrity of the program code means that the program code is not tampered or sabotaged. For example, in Step 78, a halt signal $S_{HALT}$ can be sent to the processor cores 20 to accordingly provide an abnormal message to inform a user an error has occurred. Alternatively, after recording an abnormal event, the entire embedded system 10 is directly rebooted.

It can be seen from the control method in FIG. 3 that, the authentication process for the integrity of the program code to be authenticated and operations of the processor cores 20 are performed in parallel. During the runtime of the processor cores 20, the hash module 50 continuously and periodically checks the integrity of the program code to be authenticated in the background. After completing the boot procedure 60, the processor cores 20 are informed within a short period once the program code to be authenticated is changed, such that possible subsequent disruption can be immediately interrupted.

In FIG. 3, the golden value and the initial value are re-generated in the boot procedure 60, for example.

Figure 4:
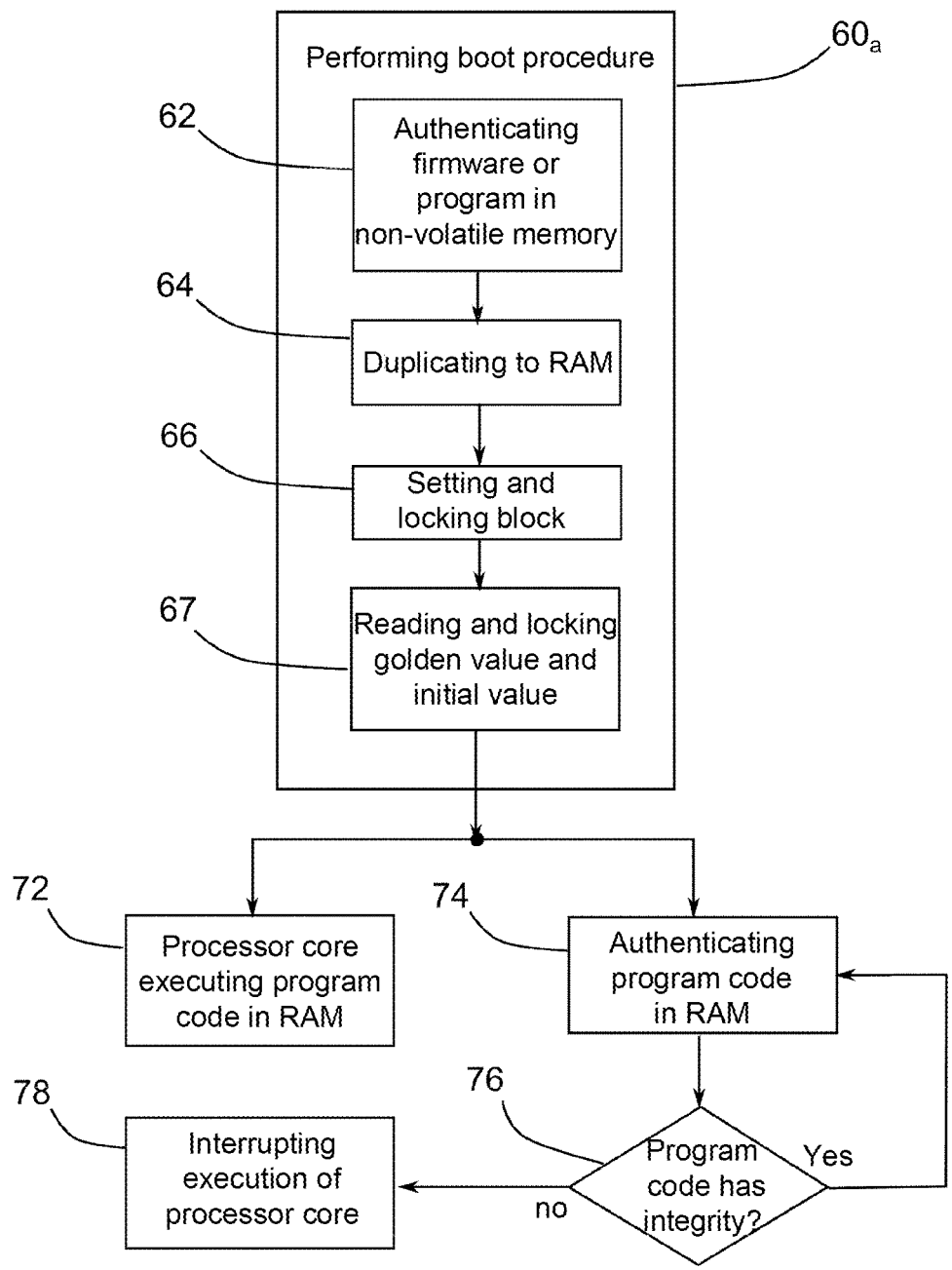
FIG. 4 is a control method for an embedded device according to another embodiment of the present invention.

FIG. 4 shows a control method for an embedded device according to another embodiment of the present invention. In the embodiment in FIG. 4, a non-volatile memory initially recording the firmware, the program and the scalar-and-gather table also permanently records the golden value and the initial value. Therefore, Steps 68 and 70 in FIG. 3 are omitted in the control method in FIG. 4, and Step 67 is added in FIG. 4 to directly read the locked golden value and initial value from the non-volatile memory.

In this embodiment, a boot procedure 60a may further include Step 62 before Step 64. In Step 62, the embedded device 10 first authenticates the integrity of the firmware or program. In Step 62, since the golden value and the initial value are known and are jointly stored in the non-volatile memory with the firmware or program, the embedded device 10 may in advance perform the authentication before duplicating the firmware or program and the scalar-and-gather table to the corresponding blocks in the RAM 16 in Step 64. For example, the embedded device 10 checks the digital signature of the firmware or program to be executed, and compares the digital signature with a predetermined digital signature to confirm the integrity of the firmware or program.

The scalar-and-gather table may also be authenticated in Step 62. In Step 64, the firmware or program with intact integrity and the scalar-and-gather table are duplicated to be stored in the corresponding blocks in the RAM 16.

For example, the authentication module 22 may be an independent application-specific integrated circuit (ASIC) entirely implemented by hardware, as shown in FIG. 1.

In an alternative embodiment, the authentication module may be implemented by software. In yet an alternative embodiment of the present invention, an embedded device has a dedicated authentication processor core and a ROM. The ROM includes associated authentication module program. The authentication processor core continuously and periodically checks the integrity of the program code to be authenticated in the background according to the authentication module program.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A control method for an embedded device, comprising:
performing a boot procedure before executing a program code;
wherein, the boot procedure comprises:
duplicating data-to-be-authenticated to an external random access memory (RAM); and
generating a predetermined digital signature by using the data-to-be-authenticated as an input;
executing the program code in the external random access memory (RAM);
authenticating data-to-be-authenticated comprising the program code, comprising:
generating a current digital signature by using the data-to-be-authenticated as an input; and
comparing the current digital signature with the predetermined digital signature; and
halting execution of the program code in the RAM when the current digital signature does not match the predetermined digital signature;
wherein, the program code remains unchanged during operation; and
wherein, the current digital signature is a hash value, and the predetermined digital signature and an initial value are separately stored in an integrated circuit and cannot be modified unless a reboot is performed or the integrated circuit is reset.

2. The control method according to claim 1, further comprising: periodically performing the authenticating step when the current digital signature matches the predetermined digital signature.

3. The control method according to claim 1, wherein the data-to-be-authenticated comprises a scalar-and-gather table, and the scalar-and-gather table comprises a location of the program code in the external RAM and a location of the scalar-and-gather table in the external RAM.

4. The control method according to claim 3, wherein after the scalar-and-gather table is stored in a block of the external RAM, the block is written only when a reboot or a reset procedure is performed.

5. The control method according to claim 1, wherein the external RAM is a dynamic random access memory (DRAM).

6. The control method according to claim 1, wherein the authenticating step generates the current digital signature by further using the initial value as part of the input according to a hash function.

7. The control method according to claim 6, wherein the initial value is generated according to a random number generating function.

8. The control method according to claim 1, wherein the predetermined digital signature is unchanged after a boot procedure.

9. The control method according to claim 1, further comprising: duplicating the data-to-be-authenticated from a read-only memory (ROM) to the external RAM.

10. An embedded device, comprising:
an external RAM, storing data-to-be-authenticated comprising a program code; and a processor comprising a processor core for executing the program code; and an authentication module, for periodically accessing and authenticating the data-to-be-authenticated in the external RAM, the authentication module comprising:

an initial value module, for providing an initial value;

a hash module, for periodically accessing the data-to-be-authenticated in the external RAM, and calculating a hash value according to the initial value; and a comparing module, for comparing the hash value with a golden value representing a predetermined hash value for the data-to-be-authenticated:

wherein, it is determined that the data-to-be-authenticated is lacking integrity when the hash value does not match the golden value;

wherein, when it is determined that the data-to-be-authenticated is lack of integrity, the authentication module interrupts the processor core from executing the program code; and wherein, the program code remains unchanged during operation, and after generating the golden value and the initial value, the golden value and the initial value are changed only when a reboot or a reset procedure is performed;

wherein the initial value module comprises a random number generator for generating the initial value in a boot procedure.

11. The embedded device according to claim 10, wherein the golden value is the predetermined hash value generated from a first calculation by the hash module in the boot procedure.

12. The embedded device according to claim 10, further comprising: a read-only memory (ROM), for non-volatile storage of the data-to-be-authenticated.

13. The embedded device according to claim 10, wherein the data-to-be-authenticated comprises a scalar-and-gather table, the scalar-and-gather table comprises a location of the program code in the external RAM and a location of the scalar-and-gather table in the external RAM.

14. The embedded device according to claim 13, wherein after the scalar- and-gather table is stored in a block for storing the scalar-and-gather table in the external RAM, the block is only written when a reboot or a reset procedure is performed.

* * * * *